A. L. RIGGS.

SPARK PLUG.

APPLICATION FILED JUNE 17, 1918.

Reissued Oct. 15, 1918. 14,537.

WITNESSES

J. Hebel Bradley

Glenn H. Lerscher

INVENTOR

Alfred L. Riggs,

By Frederick P. Fenter

Attorney

UNITED STATES PATENT OFFICE.

ALFRED LEANDER RIGGS, OF PITTSBURGH, PENNSYLVANIA, ASSIGNOR TO VISIBLE SPARK PLUG COMPANY, A CORPORATION OF DELAWARE.

SPARK-PLUG.

14,537. Specification of Reissued Letters Patent. Reissued Oct. 15, 1918.

Original No. 1,247,012, dated November 20, 1907, Serial No. 123,923, filed October 5, 1916. Application for reissue filed June 17, 1918. Serial No. 240,510.

*To all whom it may concern:*

Be it known that I, ALFRED L. RIGGS, a citizen of the United States, now residing at Pittsburgh, county of Allegheny, and State of Pennsylvania, have invented new and useful Improvements in Spark-Plugs, of which the following is a specification.

This invention relates to spark plugs the object in view being to produce a spark plug in which provision is made for determining at a glance whether or not current is being fed to the electrodes or being short circuited for any of the usual reasons.

More specifically stated, the object of the invention is to provide a spark plug in which a portion of one of the electrodes is exposed to the vision while the spark plug is in position with respect to the engine cylinder with which it is associated, enabling any one to observe in an instant whether the current is being fed to and received by said electrode.

Another object in view is to so arrange the visual portion of the device that it is not necessary to turn the plug or any parts thereof in order to obtain a view of the exposed portion of the electrode, the view being obtained through the extreme outer end of the plug.

With the above and other objects in view, the invention consists in the novel construction, combination and arrangement of parts, herein described, illustrated and claimed.

In the accompanying drawing:—

Figure 1:
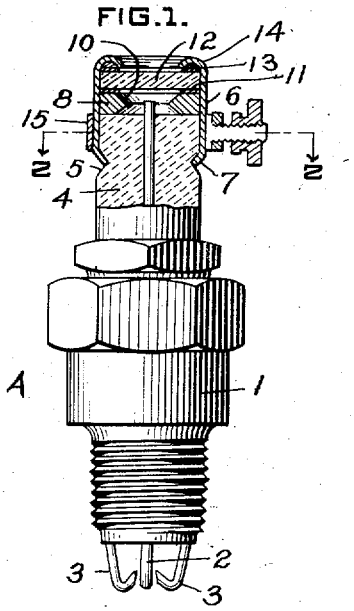
Figure 1 is a side elevation of a spark plug partly in section, illustrating the important feature.

Referring to the drawings A designates generally a spark plug comprising the metallic outer shell 1, the power electrode 2, the ground electrodes 3 and the insulating core 4 which is usually of porcelain or raw hide and is formed with a central opening through which the power electrode 2 is inserted.

In the preferred embodiment of this invention, the outer end of the core 4 is formed in its outer face with an annular recess 5. A metal sleeve 6 is inserted over the end of the core 4 and the inner end of said sleeve is spun or otherwise inwardly deflected to form a flange 7 which is pressed into the recess 5 and serves to anchor the sleeve 6 in fixed relation to the core 4.

Figure 4:
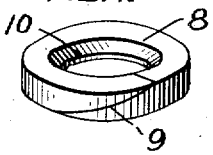
Fig. 4 is a detail perspective view of the expansible feed ring.
Figure 6:
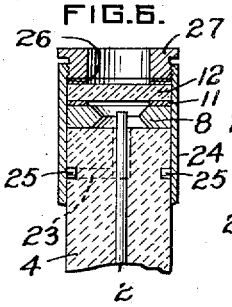
Fig. 6 is a fragmentary section taken on the same line as the upper part of Fig. 1 showing a modified way of assembling the parts.

8 designates a metal feed ring which is inserted into the sleeve against the outer extremity of the core 4 as shown in Figs. 1 and 6. This ring 8 which is illustrated in detail in Fig. 4 is of the split variety, the same being divided or split along the oblique line 9 so as to form overlapping end portions having beveled meeting faces. Internally the ring 8 is reversely beveled to form a V-shaped portion 10 which is about in the plane of the extremity of the corresponding end of the power electrode 2 as shown in the same figures, the electrode 2 extending at its outer end beyond the core 4. A gasket 11 is placed upon the ring 8 and forms a cushion for a glass panel 12 shown in the form of a disk which fits snugly within the shell 6. A packing ring 13 is placed upon the panel 12, lying against the outer face thereof. The shell 6 is then spun or pressed inwardly to form a gutter-like retaining flange 14 which overlies the packing ring 13 and serves to press said packing ring tightly against the panel 12. The panel 12 is thus held between two packing rings or gaskets of any suitable soft material which will prevent facture of the panel when the plug becomes heated.

Figure 2:
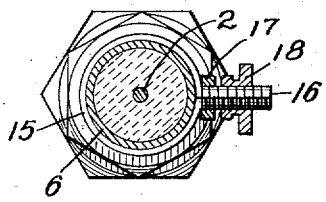
Fig. 2 is a cross section through the same on the line 2—2 of Fig. 1.
Figure 3:
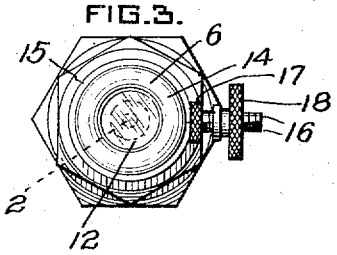
Fig. 3 is a top plan view thereof.

Encircling the shell 6 is a metal band 15 which, as shown in Fig. 2, is split and expanded to form the complemental semi-cylindrical portions 16 of a binding post, the latter being externally threaded to receive a clamping nut 17 by means of which the two parts of the binding post are clamped together and the band 15 clamped firmly around the sleeve 6. A milled nut 18 is also threaded upon the binding post and is used to clamp the current wire (not shown) against the clamping nut 17 to insure good electrical contact.

Under the arrangement hereinabove described and shown, the current received at the binding post passes through the band 15 to the shell 6 and feed ring 8 which lies in contact with the shell by reason of its inherent expansive properties, and then jumps to the power electrode 2. It is only necessary to glance through the transparent panel 12, which is preferably glass, in order to observe whether or not the current is reaching the electrode 2, as the spark will be clearly visible by reason of it having to bridge the space between the feed ring and the electrode.

Figure 5:
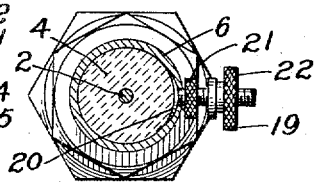
Fig. 5 is a cross section approximately on the same line as Fig. 2, showing a modified form of binding post.

Instead of using the band 15 as hereinabove described, the binding post shown at 19 in Fig. 5 may be inserted through a hole in the sleeve 6 and provided at its inner end with a head 20 which lies between the sleeve 6 and core 4. The post 19 will be provided with a clamping nut 21 and a wire retaining nut 22 corresponding with the nuts 17 and 18 of the preceding figures.

In Fig. 6 I have illustrated another way of combining the parts to produce the same result. In this instance the core 4 is formed with diametrically opposite bayonet slots 23 while the sleeve indicated at 24 and corresponding with the sleeve 6 of the preceding figures is provided with internal projections or studs 25 which are received in the bayonet slots 23 and which serve to lock the sleeve 24 to the core 4 by a partial longitudinal and a partial turning movement of the sleeve 24 in relation to the core 4. The feed ring 8, the gasket 11 and the glass or transparent panel 12 are placed within the shell 24 in the same manner as described in connection with Fig. 1. Instead of the packing ring 13 of Fig. 1, another gasket 26 of any suitable soft material is placed against the outer surface of the panel 12 and forms a seat for a tubular plug 27 which is externally threaded and screwed into the internally threaded outer extremity of the shell 24 as shown in Fig. 6, the plug 27 serving to hold the panel 12 in place while the gaskets 11 and 26 prevent fracture of the glass as the plug becomes highly heated.

I do not desire to be restricted to the exact details of construction and arrangement hereinabove described as it will be apparent that changes may be made in the form, proportion and minor details of construction which may be resorted to without departing from the principle or sacrificing any of the advantages of the invention.

The sleeve 6 with the contained and attached elements forms an attachment which can be applied to any type of spark plug having an insulating core with an axial electrode. The supplemental or pilot spark gap is entirely inclosed so that it cannot short-circuit or be rendered inoperative by the entrance of moisture or dirt and the glass 12 is exposed at the top of the plug so that it can be easily kept clean and the spark maintained visible. The attachment is very compact and projects above the top of the insulating core only a short distance and therefore avoids unnecessary projecting portions which would be liable to injury when working around the engine, or liable to break in case the plug is accidentally dropped.

I claim:

1. The combination with a spark plug, of a metal sleeve encircling the outer end portion of the core and fastened thereto, an electrode extending through said core and projecting at its outer end beyond the corresponding end of the core, a feed ring for the current encircling the outer extremity of said electrode in electrical contact with said sleeve and having a continuous annular inner edge concentric with said electrode, and means for connecting said sleeve with a source of electrical energy.

2. The combination with a spark plug, of a metal sleeve encircling the outer end portion of the core and fastened thereto, an electrode extending through said core and projecting at its outer end beyond the corresponding end of the core, a split expansion feed ring for the current encircling the outer extremity of said electrode in electrical contact with said sleeve and having a continuous annular inner edge concentric with said electrode, and means for connecting said sleeve with a source of electrical energy.

3. The combination with a spark plug, of a metal sleeve encircling the outer end portion of the core and fastened thereto, an electrode extending through said core and projecting at its outer end beyond the corresponding end of the core, a feed ring for the current encircling said electrode in electrical contact with said sleeve, and means for connecting said sleeve with a source of electrical energy, said feed ring having a reversely beveled inner face lying approximately in transverse alinement with the adjacent extremity of the electrode.

4. The combination with a spark plug, of a metal sleeve encircling the outer end portion of the core and fastened thereto, an electrode extending through said core and projecting at its outer end beyond the corresponding end of the core, a feed ring for the current encirling the outer extremity of said electrode in electrical contact with said sleeve and having a continuous annular inner edge concentric with said electrode, means for connecting said sleeve with a source of electrical energy, a split clamping band surrounding said sleeve, and a binding post on said band.

5. In a spark plug, in combination with an insulating core and an electrode extending therethrough and projecting beyond the end thereof, of an auxiliary spark attachment comprising a metal sleeve or ferrule fitting over the end of said core and open at its outer end, means for securing said sleeve or ferrule to said core, means for attaching a conductor to said sleeve or ferrule, a spark terminal in said sleeve in conducting relation thereto and in sparking relation to the end of said electrode, and a transparent member in said sleeve outside of said terminal and closing the open end of said sleeve.

6. In a spark plug, in combination with an insulating core provided near its outer end with a recess, and an electrode extending through said core and projecting beyond the end thereof, of an auxiliary spark attachment comprising a metal sleeve or ferrule fitting over the end of said core and open at its outer end and having means entering the recess in the core for securing it thereto, a spark terminal in said sleeve or ferrule in conducting relation thereto and in sparking relation to the end of said electrode, means for connecting a conductor to said sleeve or ferrule, and a transparent member in said sleeve outside of said terminal and closing the open end of said sleeve.

7. In a spark plug, in combination, with an insulating core provided near its outer end with a recess, and an electrode extending through said core and projecting beyond the end thereof, of an auxiliary spark attachment comprising a metal sleeve or ferrule fitting over the end of said core and open at its outer end and provided at its lower end with inturned portions engaging the recess in the core and serving to secure the sleeve or ferrule to the core, means for attaching a conductor to said sleeve or ferrule, a spark terminal in said sleeve in conducting relation thereto and in sparking relation to the end of said electrode, and a transparent member in said sleeve outside of said terminal and closing the open end of said sleeve.

8. In a spark plug, in combination with an insulating core and an electrode extending therethrough and projecting beyond the end thereof, of an auxiliary spark attachment comprising a metal sleeve or ferrule fitting over the end of said core and open at its outer end, means for securing said sleeve or ferrule to said core, a split expansion ring in said sleeve or ferrule and in conducting contact therewith and providing a spark terminal in sparking relation to the end of said electrode, and a transparent member in said sleeve outside of said conducting ring and serving as a closure for the open end of said sleeve.

9. In a spark plug, in combination with an insulating core and an electrode extending therethrough and projecting beyond the end thereof, of an auxiliary spark attachment comprising a metal sleeve or ferrule fitting over the end of said core and open at its outer end, means for securing said sleeve or ferrule to said core, means for attaching a conductor to said sleeve or ferrule, a spark terminal in said sleeve in conducting relation thereto and in sparking relation to the end of said electrode, a transparent member in said sleeve outside of said terminal and closing the open end of said sleeve, and packing rings on both sides of said transparent member.

10. In a spark plug, in combination with an insulating core and an electrode extending therethrough and projecting beyond the end thereof, of an auxiliary spark attachment comprising a metal sleeve or ferrule fitting over the end of said core and open at its outer end, a clamping ring surrounding said sleeve or ferrule, a binding post carried by said clamping ring for the attachment of a conductor to said sleeve or ferrule, a spark terminal in said sleeve in conducting relation thereto and in sparking relation to the end of said electrode, and a transparent member in said sleeve outside of said terminal and closing the open end of said sleeve.

11. In a spark plug, in combination with an insulating core and an electrode extending therethrough and projecting beyond the end thereof, of an auxiliary spark attachment comprising a metal sleeve or ferrule fitting over the end of said core and open at its outer end, means for securing said sleeve or ferrule to said core, a split ring fitting around said sleeve or ferrule and having its free ends extending radially and parallel to each other and threaded, clamping and conductor binding nuts in said threaded ends, a spark terminal in said sleeve in conducting relation thereto and in sparking relation to the end of said electrode, and a transparent member in said sleeve outside said terminal and closing the open end of said sleeve.

In testimony whereof I have hereunto set my hand.

ALFRED LEANDER RIGGS.

Witness:
GLENN H. LERESCHE.